United States Patent
Mardirossian (10) Patent No.: US 7,272,565 B2
(45) Date of Patent: Sep. 18, 2007

(54) SYSTEM AND METHOD FOR MONITORING INDIVIDUALS

(75) Inventor: Aris Mardirossian, Germantown, MD (US)

(73) Assignee: Technology Patents LLC., Derwood, MD (US)

( * ) Notice: Subject to any disclaimer, the term of this patent is extended or adjusted under 35 U.S.C. 154(b) by 906 days.

(21) Appl. No.: 10/320,706

(22) Filed: Dec. 17, 2002

(65) Prior Publication Data

US 2004/0116842 A1   Jun. 17, 2004

(51) Int. Cl.
*G10L 11/00* (2006.01)
*G10L 15/00* (2006.01)
*G10L 17/00* (2006.01)

(52) U.S. Cl. .................. 704/273; 704/246; 704/251

(58) Field of Classification Search .................. None
See application file for complete search history.

(56) References Cited

U.S. PATENT DOCUMENTS

| | | | | |
|---|---|---|---|---|
| 4,773,093 | A * | 9/1988 | Higgins et al. | 704/247 |
| 5,023,901 | A * | 6/1991 | Sloan et al. | 379/38 |
| 5,621,889 | A * | 4/1997 | Lermuzeaux et al. | 726/22 |
| 5,742,233 | A | 4/1998 | Hoffman et al. | |
| 6,141,644 | A * | 10/2000 | Kuhn et al. | 704/273 |
| 6,396,954 | B1 | 5/2002 | Kondo | |
| 6,480,825 | B1 | 11/2002 | Sharma et al. | |
| 6,529,881 | B2 | 3/2003 | Morganstein et al. | |
| 6,697,779 | B1 | 2/2004 | Bellegarda et al. | |
| 6,738,784 | B1 * | 5/2004 | Howes | 707/104.1 |
| 6,799,163 | B2 * | 9/2004 | Nolan | 704/273 |
| 6,839,410 | B2 | 1/2005 | Infosino | |
| 2002/0017999 | A1 | 2/2002 | Akazawa | |
| 2002/0107694 | A1 * | 8/2002 | Lerg | 704/273 |
| 2002/0198731 | A1 | 12/2002 | Barnes et al. | |
| 2003/0044050 | A1 | 3/2003 | Clark et al. | |
| 2003/0154084 | A1 * | 8/2003 | Li et al. | 704/273 |
| 2003/0200311 | A1 | 10/2003 | Baum | |
| 2004/0029564 | A1 | 2/2004 | Hodge | |
| 2004/0059923 | A1 | 3/2004 | ShamRao | |
| 2004/0064453 | A1 | 4/2004 | Ruiz et al. | |

FOREIGN PATENT DOCUMENTS

JP          63-253480       10/1988

* cited by examiner

*Primary Examiner*—David Hudspeth
*Assistant Examiner*—Matthew J. Sked
(74) *Attorney, Agent, or Firm*—Nixon & Vanderhye, PC (57) ABSTRACT

A system and method for monitoring individuals using voice print matching to match monitored speech with stored voice prints is disclosed. Voice prints of individuals are obtained and stored in a central repository for use by authorized agencies or other entity that monitor voice communications. The digitized voice prints may be used to identify the speakers being monitored. If the conversation being monitored causes the monitor, based on their predetermined alert criteria, to suspect the speakers of illegal activity, such as, for example, terrorism, or otherwise cause the monitor to seek additional information about the speakers, the monitor may access information associated with the voice print and retrieve the information associated with those individuals so that this information may be passed along to the appropriate agency or organization for further action.

22 Claims, 4 Drawing Sheets

SYSTEM AND METHOD FOR MONITORING INDIVIDUALS

CROSS-REFERENCE TO RELATED APPLICATIONS

This application is related to co-pending, commonly owned patent application Serial No. 10/335,155 filed Jan. 2, 2003, entitled "System and Method for Monitoring Individuals."

The present invention relates to a system and method for monitoring individuals. In particular, the instant invention is directed to a system and method for using, for example, digitized voice prints to identify individuals being monitored by an authorized agency, and upon such identification, providing the authorized agency with information relating to the identified individual.

BACKGROUND AND SUMMARY OF THE INVENTION

It is well known that various governmental agencies monitor voice communications to gather intelligence information. Typically, these voice communications are monitored for content, and individuals engaged in the voice communications may or may not be known to authorities. For example, if the communication is being made from a known telephone number at a fixed address, there is no guarantee that the person registered as being responsible for paying bills for costs incurred by that telephone number is actually the person engaged in the voice communication. Moreover, with the advent and increasing popularity of, for example, pre-paid telephone cards, cellular telephones and voice over IP systems, it is becoming increasingly difficult to associate a particular identity of, and information relating to, the individuals engaged in the monitored conversation.

In light of recent events, this type of monitoring is increasingly being used in an effort to prepare for or circumvent terrorist activity. Additionally, in light of recent events, it has become increasingly evident that the individuals planning and/or executing such terrorist activity have been those who have identifying information on file with various governmental agencies. For example, these individuals may be foreign nationals who are legally in the United States under student visas or who are permanent non-citizen residents of the United States, individuals with prior criminal records, prior service in the armed forces and other areas in which individual records are kept. However, the information relating to these individuals is often stored in disparate locations and under the control of various agencies that may or may not have access to one another's data.

It would be advantageous for agencies who monitor voice communications to have the ability to identify the speakers being monitored, and be provided with relevant information associated with the individuals that is available, such as, for example, known addresses, aliases, fingerprint data, DNA data, other biometric data, family history and associations.

The types of individuals identified above are routinely in contact with official governmental agencies. For example, when foreign nationals enter the country, they must present credentials to the Immigration and Naturalization Service before being allowed to enter. Those with a criminal background are routinely interviewed by parole officers. Former members of the armed forces typically receive treatment at Veterans Administration facilities and are in contact with the Department of Defense for various reasons. There are myriad circumstances in which official governmental agencies are in a position to obtain sample voice prints of these individuals. If such voice prints could be obtained, and associated with information relating to the individual, agencies monitoring voice communications would be able to quickly identify speakers being monitored, and be able to retrieve information associated with the voice print quickly for dissemination to the appropriate authorities, if necessary.

To that end, it is envisioned that a system for monitoring individuals be created in which digitized voice prints of individuals are obtained and stored in a central repository for use by authorized agencies that monitor voice communications. The digitized voice prints may be used to identify the speakers being monitored. If the conversation being monitored causes the monitoring agency, based on their predetermined alert criteria, to suspect the speakers of illegal activity, such as, for example, terrorism, or otherwise cause the monitor to seek additional information about the speakers, the monitoring agency may access information associated with the voice print and retrieve the information associated with those individuals so that this information may be passed along to the appropriate agency or organization for further action.

Thus, an embodiment of the present invention is directed to a method for identifying a speaker using digital voice prints, the method comprising: obtaining a voice sample of a speaker; storing the voice sample in a memory; associating information relating to the speaker with the voice sample in the memory; monitoring voice communications; identifying the speaker being monitored by matching the speaker's voice with a stored voice sample; and upon obtaining a successful match, outputting the associated information of the identified speaker from the memory. It will be understood that voice samples are gathered based on predetermined criteria, such as, for example, when a foreign national enters the U.S. on a student visa, a visitor visa or is entering the U.S. as a foreign national with permanent resident status. Other criteria, such as those listed above, for example, may also be used to determine when a voice sample is to be taken.

As set forth above, the voice sample is associated with additional information that is stored in the memory. This additional information may serve to assist the monitors or other agencies in locating and/or ascertaining more information relating to the speaker. For example, the associated information may include the speaker's name, known aliases, last known address, last known telephone number, nationality, visa status and number, criminal record, biometric data relating to the speaker (e.g., fingerprint data, DNA data, handwriting sample, etc.), whether the speaker owns a weapon (e.g., a registered firearm), and psychological data relating to the speaker (e.g., whether the speaker has a history of violent or malevolent behavior, etc.).

The associated information may be linked to the stored voice sample by any of a wide variety of well known data structures or relational database techniques. These data structures may, for example, be in the form of a certificate or form having the characteristics or information to be associated with a particular voice sample. These data structures may be stored in a memory separate from the memory storing the voice sample, or in the same memory. In any event, it would be advantageous to efficiently link the associated data structure with the corresponding voice sample to ensure quick and accurate access to the data once a voice sample match is obtained.

Additionally, a system for monitoring individuals is contemplated. The system for monitoring individuals, comprising: a circuit for obtaining a voice sample; a memory for storing the voice sample together with associated data relating to the speaker whose voice sample is being stored; a monitor for monitoring voice communications; a processor for matching a voice sample obtained from the monitor with a voice sample stored in the memory and, if a match is found, outputting associated data of the speaker whose voice sample stored in the memory matches the monitored voice sample.

BRIEF DESCRIPTION OF THE DRAWINGS

The invention will be described in detail herein with reference to the following drawings in which like reference numerals refer to like elements, and wherein.

DETAILED DESCRIPTION OF EXEMPLARY EMBODIMENTS

Exemplary embodiments of the invention will be described herein with reference to the figures. Operation of the exemplary embodiments of the invention will be described with reference to a voice sample obtained from, for example, a foreign student entering the U.S. on a student visa. However, it will be appreciated and understood that the exemplary embodiments of the invention apply equally to any number of individuals and agencies, as noted, for example, above in the Background and Summary of the Invention section.

Figure 1:
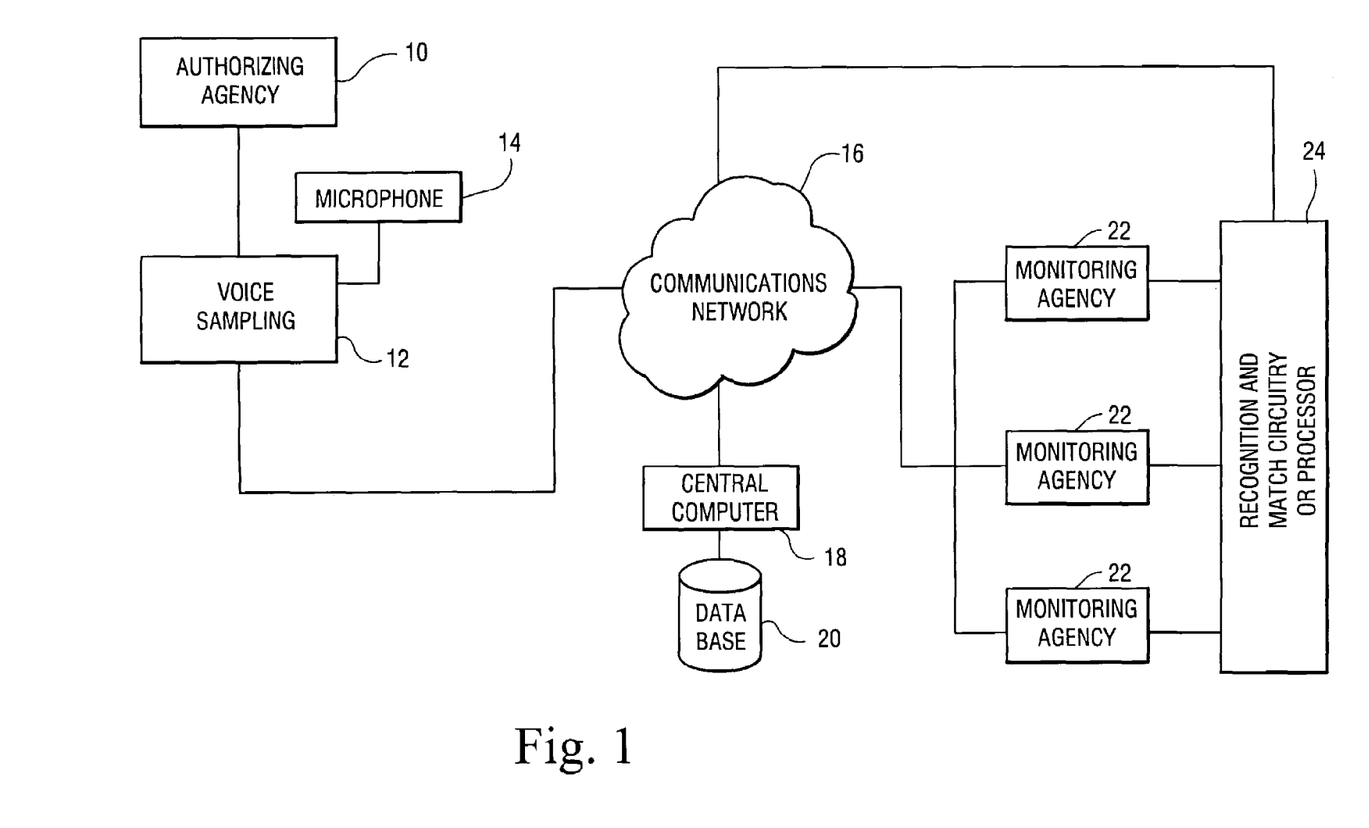
FIG. 1 is a block diagram of an illustrative embodiment of the invention.

FIG. 1 is a block diagram illustrating an exemplary embodiment of the system of the invention. In particular, FIG. 1 shows an authorizing agency 10, such as, for example, the Immigration and Naturalization Service of the U.S. Government (INS).

A voice sample is obtained by having a speaker speak into a microphone 14. The microphone 14 provides its output to a voice sampling system 12. The voice sampling system 12 may be any type of commercially available system typically available at most computer retailers. The voice sampling system 12 receives the output of the microphone 14 and samples the voice received using any of a variety of well known techniques. The voice sample is then digitized and stored in any of a number of well known forms, including, for example, a phonemic representation of the voice pattern. It will be understood that it may be necessary for the speaker to read or repeat a predetermined phrase into the microphone 14 so that the voice sampling system 12 is able to obtain a large enough volume of, for example, phonemes, for subsequent recognition and matching.

The voice sampling system 12 is in communication with a central computer 18 via a telecommunications network, such as, for example, a governmental data communication network, the Internet, or the like. The central computer 18 may be connected to numerous voice sampling systems 12. For example, all of the INS immigration stations and entry points in the U.S. may be connected to the central computer 18. The central computer 18 is in communication with a central database 20. The central database stores the voice samples obtained by various agencies throughout the system.

The authorizing agency 10 typically possesses information relating to the speaker who is providing a voice sample for the system. In the example relating to a foreign student, this information may include, for example, the speaker's name, residence address while in the U.S., name of institution where the speaker is studying, visa number and visa related INS information from the visa application, fingerprint information, a photograph, etc. Some or all of the available associated information may be included in a certificate illustrated in FIG. 4 and discussed in more detail below. This certificate may be associated or linked by the central computer 18 with the voice sample corresponding to a speaker whose information appears on the certificate and is stored in the central database 20. Linking algorithms and relational database techniques may, for example, be used to relate the associated data to the voice sample. Because the voice sample is linked to the associated information, when a match between a monitored voice and a stored voice sample is obtained, it will be relatively efficient to retrieve the associated information relating to the identified speaker.

The central computer 18 and central database 20 are connected to various monitoring agencies via a communications network 16. This communications network may be the same as that used to transfer the voice sample and, when necessary, associated data to the central computer 18, or it may be a separate network or dedicated communications connection, for example. The monitoring agency 22 may be, for example, an intelligence agency that monitors telecommunications traffic on any of a variety of communications circuits, for example, a public switched telephone network (PSTN), radio network, cellular network, voice over IP communications network, etc. The monitoring agency 22 may submit voice samples obtained during monitoring of the various communications circuits (not shown) to a dedicated or shared distributed system 24 for processing the monitored voice sample and determining if a match exists between any of the voice samples stored in the central database 20 and the voice sample extracted during monitoring. The recognition and matching is preferably achieved by algorithms running on a computer. However, it will be understood that hardware circuitry for performing the same functions will be easily and readily constructed by one of ordinary skill in the art. The recognition and matching system 24 is also preferably in communication with the central computer 18 and central database 20 over, for example, a dedicated communications network (not shown), the common communication network 16, or any other communication network. It will be understood that the recognition and matching system 24 may be integrated with the voice monitoring devices (not shown) used by the monitoring agency 22. In an exemplary embodiment illustrated in FIG. 1, the monitoring system is separate from the centralized recognition and matching system which is preferably realized on a single computer. Any variety of architectures for achieving the functionality of the monitoring and recognition and matching systems may be employed, including, for example, a single computer in which the monitoring and recognition and match functionality are integrated and realized together, each of the single computers having integrated functionality being located at the individual monitoring sites or locations.

Figure 2:
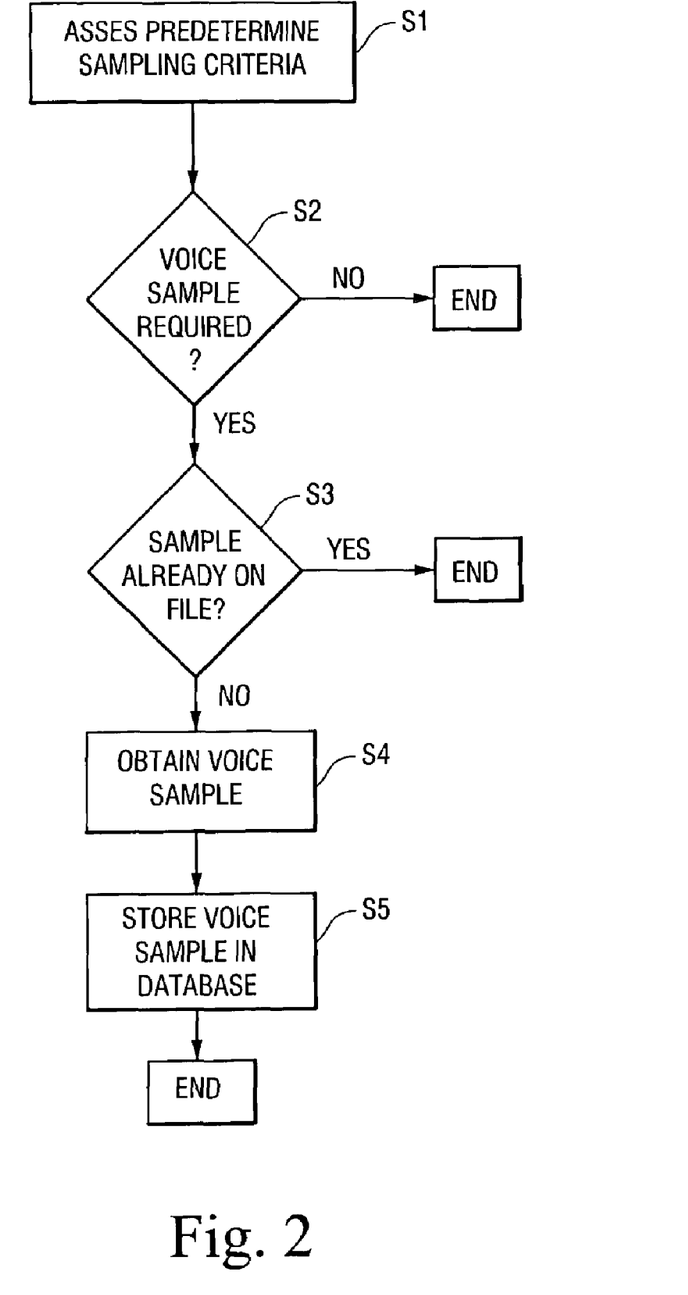
FIG. 2 is a flowchart illustrating the operation of obtaining a voice sample according to an exemplary embodiment of the invention.

FIG. 2 is a flowchart illustrating an exemplary procedure for obtaining a voice sample from an individual of interest. In step S1, the agency, in this example, the INS, determines if the individual entering the country is a person of interest, i.e., an individual whose voice sample is to be taken. The criteria for determining whose voice sample to take may be any of a number of differing criteria or profiles that are determined by the agency authorizing the sampling of the individual's voice. In the example discussed herein, a foreign national entering the U.S. on a student visa fits the criteria for having a voice sample taken. Upon identification of an individual fitting the predetermined criteria of the agency in step S1, a determination is made in step S2 as to whether a voice sample is required. If no sample is required, the individual is allowed to end the sampling process and pass through the normal immigration checking procedure. If step S2 requires that a voice sample be taken, then a determination is made in step S3 as to whether a sample of the individual's voice is already on file, i.e., in the database 20. This checking may be done in a wide variety of ways that will be readily apparent to those skilled in the art. For example, the sampled voice may be compared with the voice samples in the database to determine if the voice sample is already stored in the database. Alternatively, for example, there may be a listing of names of individuals whose voice sample has already been taken. This list may be checked by the INS agent who is processing the individual. If the agent receives an indication that no voice print is required, the agent may pass the individual along for normal processing. If it is determines in step S3 that a voice sample is not on file and is still required, a sample is obtained in step S4 as set forth above with respect to FIG. 1, for example, via a microphone 14 and voice sampling system 12. In step S5, the sample, in the form output by the voice sampling system 12, is transmitted via the communications network 16 to the database 20 via the computer 18. Associated data of the individual being sampled is concurrently entered S6 into appropriate fields of the information certificate 50 shown, for example, in FIG. 4. The associated data certificate 50 is stored, for example, in the database 20, together with linking information that will link the certificate 50 to the appropriate voice sample.

Figure 3:
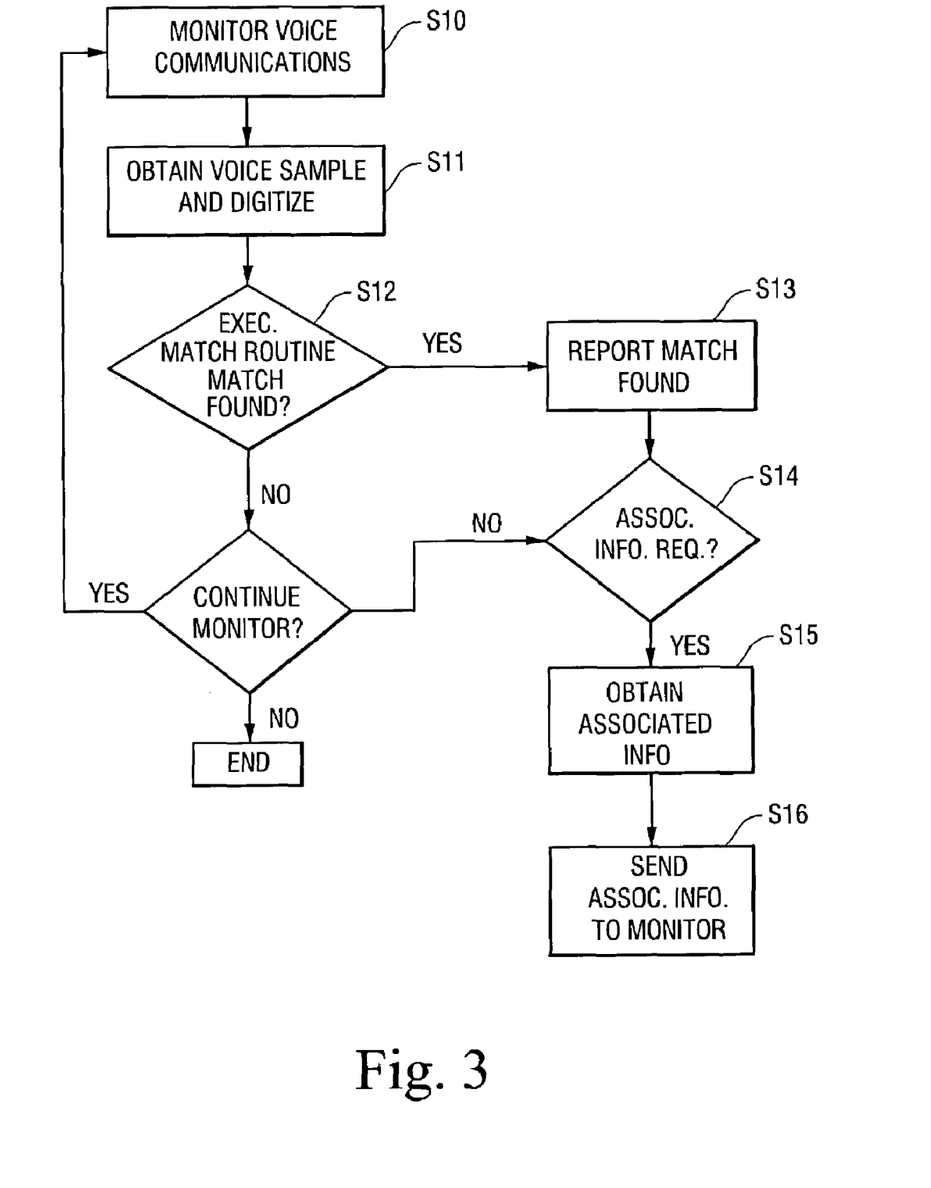
FIG. 3 is a flowchart illustrating a matching operation that matches a stored voice sample with a voice sample of a speaker being monitored according to an exemplary embodiment of the invention.

FIG. 3 is a flowchart illustrating the matching operation that is conducted by the monitoring agency 22 via the recognition and match system 24. When an agency monitoring voice communications identifies a conversation of interest, it may sample the voice being monitored S10. The voice sample is digitized S11, for example, using the same or similar sampling and digitizing techniques as the voice sampling system 12 that was used to obtain the original voice sample stored in the database 20. The digital voice sample of the person being monitored is transmitted to the recognition and match system 24 that executes a match algorithm or procedure S12, for example. As set forth above, the matching procedure is preferably realized via a software algorithm running on a processor. However, a hardware implementation may be equally acceptable. If the match algorithm S12 identifies a match with a stored voice sample, the fact that a match has been found is communicated to the monitoring agency 22. If the monitoring agency 22 determines that associated information of the speaker is needed, a request S14 for that associated information is communicated to the central computer 18, which then extracts S15 the associated information from the database 20 and communicates the associated information to the agency 22 in step S16. If no match is found, the monitoring agency 22 may continue monitoring voice communications and recursively continue the monitoring process.

Figure 4:
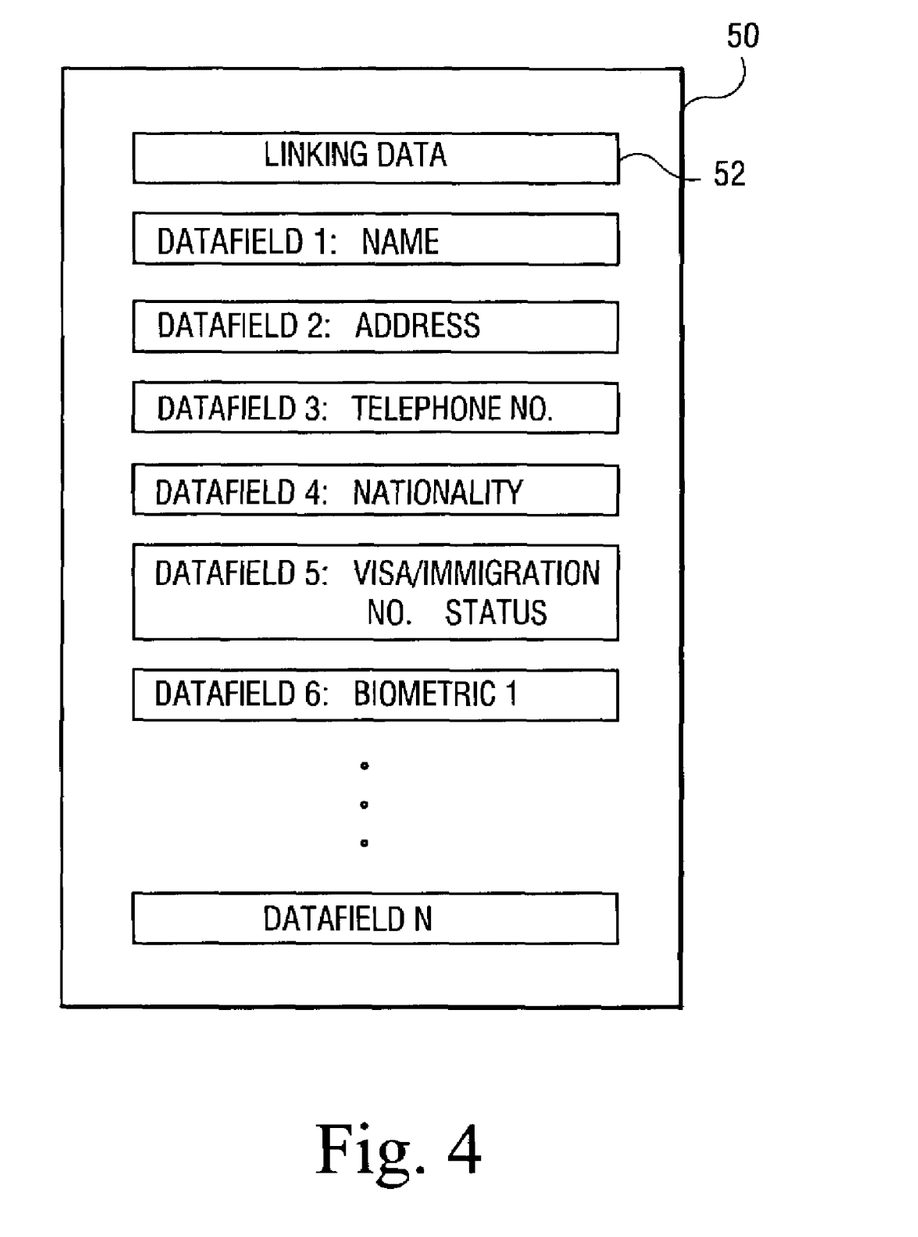
FIG. 4 is a diagram illustrating a data structure of information associated with a voice sample according to an exemplary embodiment of the invention.

FIG. 4 is an illustrative diagram of a data structure or certificate 50 that contains various information associated with the stored voice samples, and is linked thereto. As shown in FIG. 4, the certificate 50 may contain any number N of data fields, each data field containing information regarding the speaker whose voice has been sampled and stored. For example, the associated information may include the speaker's name, known aliases, last known address, last known telephone number, nationality, visa status and number, criminal record, biometric data relating to the speaker (e.g., fingerprint data, DNA data, handwriting sample, etc.), whether the speaker owns a weapon (e.g., a registered firearm), and psychological data relating to the speaker (e.g., whether the speaker has a history of violent or malevolent behavior, etc.). The number of data fields N and the information included in those data fields is a choice that is made by the agencies using the system, and is a function of information that is typically available regarding an individual whose voice has been sampled. The certificate 50 may also include a linking data field 52 that may aid in the extraction of the associated information when a match has been found.

Exemplary operation of the system will be described with reference to a foreign national entering the U.S. on a student visa. It will be understood, that this example applies equally to any other individual who has occasion to have his or her voice sampled and stored together with associated data, and that the system is not limited to use via immigration channels.

In operation, when an individual is being processed by an agency, in this example, entering the U.S. on a student visa, the entry point processor 10 may request that a voice sample of the individual be obtained and stored in the database 20 together with associated information of the individual. The authorizing agency will typically have predetermined procedures and profiles of individuals who, upon entering the U.S., may be required to submit a voice sample. In the example being discussed herein, the INS requires foreign nationals entering the U.S. on a student visa to provide a voice sample. If the determination is made by the agency 10 that a voice sample is to be obtained, the individual is required to speak into a microphone or like device to provide a voice sample to a voice sampling system 12. The speaker may be required to make specific utterances into the microphone 14 to provide sufficient information to the voice sampling system 12. The voice sampling system 12, upon receiving the sampled voice data, digitizes the voice sample and puts it into a suitable format for subsequent match processing, such as, for example, digital phonemic representations of the sampled speech.

The sampled speech is stored in a database 20. Information associated with the speaker whose sampled speech is stored in the database is linked to the voice sample being stored. The information associated with the voice sample may be in the form of a certificate 50 as described above with respect to FIG. 4 which includes linking data to ensure that the voice sample is linked to the certificate 50.

In the foregoing manner, a database 20 of voice samples and associated information linked thereto, can be built by inputs from various authorities based on numerous and varied criteria. The database 20, once constructed, will be available to any and all monitoring agencies authorized to access the database 20 by the owner of the database 20, such as, for example, the United States Government.

Monitoring agencies 22 typically monitor voice communications occurring over a variety of telecommunications circuits (not shown). For example, the monitoring agencies 22 may monitor public switched telephone networks (PSTNs), radio networks, cellular networks, voice over IP communications networks, etc. If the conversation being monitored causes the monitoring agency, based on their predetermined alert criteria, to suspect the speakers of illegal activity, such as, for example, terrorism, or otherwise cause the monitor to seek additional information about the speakers, the monitoring agency may be desirous of accessing information associated with the voice being monitored and retrieving the information associated with those individuals so that this information may be passed along to the appropriate agency or organization for further action using the system and method of the present invention.

Accordingly, when a monitoring agency 22 determines that a monitored conversation is of sufficient interest, it may extract a voice sample of the speaker(s) engaged in the monitored conversation. The voice sample(s) is taken and processed in a manner similar to the voice sample obtained from the speaker originally. For example, the monitored voice sample is digitized and processed into a suitable form for achieving efficient and fast recognition processing. As set forth above, the sample may preferably be digitized and stored in a phonemic representation. Upon extracting a voice sample for matching, the monitoring agency 22 communicates the voice sample to the recognition and match system. The recognition and match system 24 compares the monitored voice sample to the voice samples stored in the central database 20. If no match is realized, a message to that effect will be transmitted to the monitoring agency 22 that requested the check. If a match is realized, the central computer 18 may query the monitoring agency 22 to determine if additional information regarding the speaker should be communicated to the monitoring agency. For example, the conversation being monitored may be of low priority and the monitoring agency 22 may only desire to know the speaker's identity, and is not concerned with other information. Alternatively, the central computer 18 may automatically send the associated information related to the speaker to the monitoring agency 22.

Upon receipt of the identifying and associated information of the speaker, the monitoring agency 22 may then take whatever action it deems necessary based on, for example, the nature of the monitored conversation, the nature of the speaker, etc. Alternatively, the monitoring agency 22 may communicate the information regarding the speaker and the nature of the conversation being monitored to another authority, for example, law enforcement authorities, for further action based on the monitored conversation and the associated information.

It may also be desirable to determine the location of a speaker being monitored while the conversation is being monitored. The location of a speaker being monitored may be ascertained in various ways. For example, a speaker using a conventional telephone may be located using caller ID information and/or well known telephone tracing methodologies available on PSTNs. On the other hand, if a speaker is using a cellular telephone, it is possible to determine which base station(s) is being used to transmit and/or receive the cellular signal to/from the cellular telephone being monitored, and to superimpose global positioning system (GPS) information on a map showing the locations of terrestrial base stations, to determine the physical location of a speaker within a reasonable range. Similarly, if a speaker is using conventional radio frequency devices, such as, for example, walkie talkies, it may be possible using triangulation techniques in combination with GPS overlays to determine the location of a speaker within a reasonable range. In any event, speaker location data may be stored together with the associated data linked to the speaker's voice sample in the database.

It will be understood that the initial voice sampling need not be obtained at an entry point to the U.S., but may be taken at an office where the speaker is being processed for any of a variety of reasons, such as, for example, those set forth above in the Background and Summary sections.

While the invention has been described in conjunction with specific exemplary embodiments thereof, it is evident that many alternatives, modifications and variations will be apparent to those skilled in the art. Accordingly, the exemplary embodiments of the invention, as set forth herein, are intended to be illustrative, not limiting. Various changes may be made without departing from the true spirit and full scope of the invention, as defined in the following claims.

What is claimed is:

1. A system for monitoring individuals using voice samples, comprising:
    a circuit for obtaining a voice sample of an individual based on predetermined criteria, said predetermined criteria being at least one of: a foreign national having a student visa, a foreign national having a visitors visa, and a foreign national having permanent resident alien status;
    a first memory for storing said voice sample;
    a second memory for storing information relating to an individual whose voice sample has been stored in said first memory;
    a monitor for monitoring a voice communication; and
    a comparator for comparing a voice sample obtained by said monitor with a voice sample stored in said first memory and, if the individual providing the voice sample obtained by said monitor is found to match the individual providing the voice sample stored in said first memory, outputting an indication that a match has been found to said monitor;
    wherein said system may communicate information regarding an individual for whom a match is found to an appropriate authority based on content of the monitored communication.

2. A system according to claim 1, wherein said comparator further outputs information from said second memory relating to the individual for whom a match is found.

3. A system according to claim 1, wherein said information relating to an individual includes at least one of the following: name of the individual, aliases of said individual, immigration status of said individual, visa number of said individual, nationality of said individual, last known address of said individual, last known telephone number of said individual, biometric data relating to said individual and criminal record of said individual.

4. A system according to claim 1, wherein said first memory and said second memory are part of a single database.

5. A system according to claim 1, wherein said voice sample is capable of being stored as a digital phonemic representation.

6. A system according to claim 1, wherein said comparator is a computer-based processor.

7. A method for monitoring individuals using voice samples, comprising:
    obtaining a voice sample of an individual based on predetermined criteria, said predetermined criteria being at least one of: a foreign national having a student visa, a foreign national having a visitors visa, and a foreign national having permanent resident alien status;
    storing said voice sample in a first memory;

storing information relating to an individual whose voice sample has been stored in said first memory in a second memory;

monitoring a voice communication;

comparing a voice sample obtained by said monitor with a voice sample stored in said first memory to determine whether the individual providing said voice sample obtained based on predetermined criteria matches the individual providing the voice sample obtained by said monitor and, if a match is found, outputting an indication that a match has been found to said monitor; and communicating information regarding an individual for whom a match is found to an appropriate authority based on content of the monitored communication.

8. A method according to claim 7, further comprising:

outputting information from said second memory relating to the individual for whom a match is found.

9. A method according to claim 7, wherein said information relating to an individual includes at least one of the following: name of the individual, aliases of said individual, immigration status of said individual, visa number of said individual, nationality of said individual, last known address of said individual, last known telephone number of said individual, biometric data relating to said individual and criminal record of said individual.

10. A method according to claim 7, wherein the step of obtaining a voice sample includes converting the voice sample into a digital phonemic representation.

11. A method according to claim 7, further comprising the step of determining a location of an individual being monitored.

12. A system for monitoring individuals using voice samples, comprising:

a circuit for obtaining a voice sample of an individual based on predetermined criteria;

a database for storing said voice sample and information relating to an individual whose voice sample has been stored in said database;

a monitor for monitoring a voice communication; and a processor for comparing a voice sample obtained by said monitor with a voice sample stored in said database and, if the individual providing the voice sample obtained by said monitor is found to match the individual providing the voice sample stored in said database, outputting an indication that a match has been found to said monitor;

wherein said system may communicate information regarding an individual for whom a match is found to an appropriate authority based on content of the monitored communication.

13. A system according to claim 12, wherein said predetermined criteria includes at least one of: a foreign national having a student visa, a foreign national having a visitors visa, and a foreign national having permanent resident alien status.

14. A system according to claim 12, wherein said voice sample is capable of being stored as a digital phonemic representation.

15. A system according to claim 12, wherein said information relating to an individual includes at least one of the following: name of the individual, aliases of said individual, immigration status of said individual, visa number of said individual, nationality of said individual, last known address of said individual, last known telephone number of said individual, biometric data relating to said individual and criminal record of said individual.

16. A system according to claim 12, wherein said information relating to an individual is stored as a digital certificate.

17. A system according to claim 12, wherein said processor determines a location of an individual being monitored.

18. A method for monitoring individuals using voice samples, comprising:

obtaining a voice sample of an individual based on predetermined criteria;

storing said voice sample in a database;

storing in said database information relating to an individual whose voice sample has been stored in said database;

monitoring a voice communication;

comparing a voice sample obtained by said monitor with a voice sample stored in said database and, if the individual providing the voice sample obtained by said monitor is found to match the individual providing the voice sample stored in said database, outputting an indication that a match has been found to said monitor; and communicating information regarding an individual for whom a match is found to an appropriate authority based on content of the monitored communication.

19. A system for monitoring individuals using voice samples, comprising:

a circuit for obtaining a voice sample of an individual based on predetermined criteria, said predetermined criteria being at least one of: a foreign national having a student visa, a foreign national having a visitors visa, and a foreign national having permanent resident alien status;

a first memory for storing said voice sample;

a second memory for storing information relating to an individual whose voice sample has been stored in said first memory;

a monitor for monitoring a voice communication and for determining, based on the content of said voice communication, whether said voice communication is of interest; and a comparator for comparing, if said voice communication is of interest, a voice sample obtained by said monitor with a voice sample stored in said first memory and for, if the individual providing the voice sample obtained by said monitor is found to match the individual providing the voice sample stored in said first memory, outputting an indication that a match has been found to said monitor;

wherein said system may communicate information regarding an individual for whom a match is found to an appropriate authority based on content of the monitored communication.

20. A method for monitoring individuals using voice samples, comprising:

obtaining a voice sample of an individual based on predetermined criteria, said predetermined criteria being at least one of: a foreign national having a student visa, a foreign national having a visitors visa, and a foreign national having permanent resident alien status;

storing said voice sample in a first memory;

storing information relating to an individual whose voice sample has been stored in said first memory in a second memory;

monitoring a voice communication;

determining, based on the content of said voice communication, whether said voice communication is of interest, comparing, if said voice communication is of interest, a voice sample obtained by said monitor with a voice sample stored in said first memory to determine whether the individual providing said voice sample obtained based on predetermined criteria matches the individual providing the voice sample obtained by said monitor and, if a match is found, outputting an indication that a match has been found to said monitor; and communicating information regarding an individual for whom a match is found to an appropriate authority based on content of the monitored communication.

21. A system for monitoring individuals using voice samples, comprising:

a circuit for obtaining a voice sample of an individual based on predetermined criteria;

a database for storing said voice sample and information relating to an individual whose voice sample has been stored in said database;

a monitor for monitoring a voice communication and for determining, based on the content of said voice communication, whether said voice communication is of interest; and a processor for comparing, if said voice communication is of interest, a voice sample obtained by said monitor with a voice sample stored in said database and for, if the individual providing the voice sample obtained by said monitor is found to match the individual providing the voice sample stored in said database, outputting an indication that a match has been found to said monitor;

wherein said system may communicate information regarding an individual for whom a match is found to an appropriate authority based on content of the monitored communication.

22. A method for monitoring individuals using voice samples, comprising:

obtaining a voice sample of an individual based on predetermined criteria;

storing said voice sample in a database;

storing in said database information relating to an individual whose voice sample has been stored in said database;

monitoring a voice communication;

determining, based on the content of said voice communication, whether said voice communication is of interest, comparing, if said voice communication is of interest, a voice sample obtained by said monitor with a voice sample stored in said database to determine whether the individual providing said voice sample stored in said database matches the individual providing the voice sample obtained by said monitor and, if a match is found, outputting an indication that a match has been found to said monitor; and communicating information regarding an individual for whom a match is found to an appropriate authority based on content of the monitored communication.

\* \* \* \* \*